United States Patent [19]

Leininger et al.

[11] Patent Number: 5,000,580
[45] Date of Patent: Mar. 19, 1991

[54] APPARATUS AND METHOD FOR MEASURING TEMPERATURES INSIDE PROCESS VESSELS CONTAINING A HOSTILE ENVIRONMENT

[75] Inventors: Thomas F. Leininger, Walnut; Richard D. Cary, Ontario; Gus Zachariou, Long Beach, all of Calif.

[73] Assignee: Texaco Inc., White Plains, N.Y.

[21] Appl. No.: 395,676

[22] Filed: Aug. 18, 1989

[51] Int. Cl.⁵ ........................... G01K 1/12; G01K 5/08
[52] U.S. Cl. ...................................... 374/130; 356/44; 374/139
[58] Field of Search ............... 374/125, 130, 141, 142, 374/143, 139, 208; 356/43, 44; 266/87, 89, 99; 350/584; 376/247

[56] References Cited

U.S. PATENT DOCUMENTS

| | | | |
|---|---|---|---|
| 4,400,097 | 8/1983 | Koschnitzke et al. | 374/123 X |
| 4,411,533 | 10/1983 | Loftus et al. | 374/141 X |
| 4,435,093 | 3/1984 | Krause et al. | 374/141 X |
| 4,468,771 | 8/1984 | Zhukov et al. | 356/44 X |
| 4,525,080 | 6/1985 | Smith | 374/125 X |
| 4,533,243 | 8/1985 | Zhukov et al. | 356/44 |
| 4,836,689 | 6/1989 | O'Brien et al. | 350/584 X |

*Primary Examiner*—Allan N. Shoap
*Assistant Examiner*—Scott Cummings
*Attorney, Agent, or Firm*—Robert A. Kulason; James J. O'Loughlin; Robert B. Burns

[57] ABSTRACT

An improved apparatus and means for measuring temperatures inside enclosures or conduits containing hot gases laden with entrained solids using a pyrometer. The improvement involves an optical access port consisting of a high strength sight tube, a safety valve, a double sight glass, various purge connections and provisions for optical alignment. A dynamic purge system keeps the optical sight path clear during normal operation, and clears the path if it begins to become occluded during operational upsets within the enclosure or conduit. The improved optical access port is mounted on the exterior wall of the vessel or conduit.

10 Claims, 1 Drawing Sheet

APPARATUS AND METHOD FOR MEASURING TEMPERATURES INSIDE PROCESS VESSELS CONTAINING A HOSTILE ENVIRONMENT

BACKGROUND OF THE INVENTION

1. Field of the Invention

This invention is generally concerned with an apparatus and a method for measuring temperature in gas filled enclosures or conduits. More specifically, it is concerned with an improvement for a system involving a pyrometer which is used to measure elevated temperatures in reaction chambers. An example of such chambers is in generators used for the production of synthesis gas via the gasification of hydrocarbon fuels in a partial oxidation process.

A gasification process may include the gasification of gaseous, liquid or solid hydrocarbons containing varying concentrations of ungasifiable ash material. The gasification reactions are carried out at high temperatures and pressures within a reactor vessel which is lined internally with successive courses of refractory material. Depending upon the composition of the hydrocarbon feedstock, the hot gases produced in such a process normally contain entrained particles of unconverted carbon, reacting hydrocarbon fuel, molten ash, and/or non-molten high melting temperature ash material. The interior refractory wall of the reaction chamber used in such a process tends to develop a layer of molten ash which runs down the vertical wall towards a bottom exit.

In a gasification process such as described above, a reliable measurement of reaction chamber temperature is very important. The reliability of the temperature measurement affects many aspects of the gasification operation including control of the reactions, safe process operation, control of the rate of deterioration of the refractory lining and control of the viscosity of the molten ash in order to ensure adequate ash removal through the bottom of the reactor.

With respect to temperature measurement, radiation pyrometers have been used to measure the temperatures of hot surfaces and hot atmospheres such as the interior of gasification reactors or the like. Radiation pyrometric techniques involve measuring the thermal radiation emitted by the hot environment and inferring the temperature from a knowledge of the radiation laws and a knowledge of, or justifiable assumptions about, the emitting characteristics of the surfaces and/or gases being measured.

2. Description of the Prior Art

The solid state radiation detectors used to measure the radiation are fairly delicate and need to be isolated from the hostile atmospheres whose temperatures are being measured. The isolation normally takes the form of a sight glass window and a gas purged sight hole formed through the vessel shell and lining. This provides the detector with a clear optical line-of-sight into the vessel interior.

One weakness of the above method of isolation is that the purged sight hole is subject to becoming blocked whenever the atmosphere being measured contains molten particles. Under such conditions the molten particles will be frozen by the cooler purge gas in the neighborhood of the purged sight hole; and the optical sight path will gradually become occluded by the accumulating material.

One prior art patent addressed to the problem of maintaining an open line-of-sight between a pyrometer and a high temperature reactor is U.S. Pat. No. 4,411,533. The invention comprises a projecting shelf formed integral with the wall and top of the sight hole for diverting molten material away from the top of the hole, and a sloped recess formed integral with the bottom of the sight hole for draining molten material away from the bottom of the hole.

Several difficulties may arise with the above system in practice. When the produced reaction gases carry a high concentration of molten particles, the large volume of molten material running down the interior vertical wall of the vessel overwhelms the capacity of the projecting shelf to divert the material away from the sight hole. In addition, if the molten material is chemically aggressive towards the refractory material used to fabricate the projecting shelf, the shelf will be attacked and will wear away.

However, the chief difficulty arises because the purge gas, which protects the optical window and sight hole from the high temperature gases inside the reaction chamber, tends to also cool the projecting shelf. As a result, the shelf becomes a cold spot which promotes the freezing of any molten material coming in contact with it. Eventually enough frozen material accumulates so that the entire sight hole becomes occluded.

In another prior patent, U.S. Pat. No. 4,400,097, the authors disclose a radiation measuring apparatus including a pyrometer. The latter receives radiation from a gasifier or reactor by way of an elongated measuring duct which is recessed in the refractory lining of the vessel. The measuring duct provides a safety chamber for the prevention of gas leaks from the vessel. The safety chamber is a hermetic housing having two optical windows which are protected from dust and condensation by a purge flow of nitrogen in an inner optical tube. Steam flowing in a second, outer optical tube is used to maintain a clear opening into the reactor. In addition, a third, heat resistant window is used to prevent steam from backflowing into the inner optical tube and condensing on the windows comprising the safety chamber.

The above features permit safe monitoring of the temperature inside a pressurized reaction chamber. However, the apparatus is incapable of readily disposing of, or displacing, material which might accumulate on the inner wall of the reaction chamber near the sight hole opening. Both the nitrogen and the steam will tend to freeze molten material around the hole, thus occluding the sight path. In addition, the third heat resistant window is, nevertheless, a relatively fragile element located in a potentially very destructive region of the vessel. If it were to break during operation, the optical sight path could become distorted and there would be no way to safely replace the window without shutting the process down and removing the entire measuring duct.

Another weakness common to both of the above prior patents is that the final portion of the sight hole nearest the reaction chamber consists simply of the hole drilled through the refractory lining of the vessel. Such holes can easily become distorted or damaged by the intense thermal and mechanical stresses which can prevail inside the contemplated reaction chambers. As a result of differences in thermal expansion coefficients, one layer of refractory may shift with respect to another, thus partially or completely blocking the sight path. Rapidly changing temperatures inside the reaction chamber can give rise to spalling of the refractory around the edges of the hole. When pieces of refractory fall off and the hole enlarges, the sight path is much more difficult to purge and keep clear of obstructions.

In summary, the apparatus provided in the prior art are subject to having their optical sight paths blocked either by accumulation of frozen material around the sight hole opening or by distortion of, or damage to, the portion of the refractory hole nearest the reaction chamber.

BRIEF STATEMENT OF THE INVENTION

Toward overcoming the above impediments to reliable temperature measurement, there is presently provided improvements for a novel system- that uses a pyrometer for high temperature measurements inside a reactor vessel.

An object, then, of this invention is to provide an improved temperature monitoring system for hostile environments in which a pyrometer is employed.

Another object is to provide an improved optical access port into harsh, particle laden environments for optical measurement devices requiring a clean sight path for accuracy and reliability.

A further object is to provide a durable optical access port into hostile environments which will not be subject to damage or distortion by the environment.

A still further object is to provide a method for periodically clearing a pyrometer's sight path which is subject to becoming occluded.

SUMMARY OF THE INVENTION

Briefly, the invention concerns a method and apparatus for measuring temperatures of hot gases laden with entrained solids contained inside refractory lined chambers or conduits. It is addressed particularly to chambers wherein the molten fraction of the entrained solids tends to form a layer of molten material on the walls of the chamber or conduit.

The apparatus consists of a pyrometer, such as an infrared ratio pyrometer, sighted into the chamber or conduit through a spool piece containing two sight glasses, a full port line-of-sight safety valve and a refractory metal sight tube. In order to accommodate the sight tube, a hole is drilled through the one or more layers of refractory material comprising the lining of the vessel or conduit. This hole is drilled coaxially with a flanged nozzle connection on the side of the vessel or conduit. The sight tube is inserted through the nozzle connection and hole so that its foremost end is flush with the inner surface of the lined vessel or conduit. The size of the hole in the refractory lining is such that a small annular gap exists between the sight tube and the hole in the lining.

In addition, means are provided for purging the sight glasses, valve and both interior and exterior surfaces of the sight tube with a suitable purge gas, or combination of purge gases, such as nitrogen or a slip stream of cooled and cleaned product synthesis gas. The sight glass spool piece, valve, sight tube, and purge means are all connected to one another and to the above said vessel nozzle in such a manner as to ensure the pressure integrity of the vessel containing the hot gases. All components of the system are maintained in precise optical alignment by the flange rings, a pyrometer alignment ring and a sight tube centering ring.

In addition to the above combination of elements, a control system is provided that not only monitors all flows and pressures within the purge system, but also provides a means to dynamically regulate the purge streams and pulses in response to changing conditions with the chamber or conduit. A primary aspect of this invention is that purge gas flow rates and pulses can be controlled in such a way as to not only keep the sight path clear, but also to open it up again if it has become occluded as the result of difficult operating conditions within the chamber or conduit.

A safety system is also provided and consists of a means to monitor the integrity of both sight glasses, as well as a means to take remedial action in the unlikely event that one or both of the sight glasses fails.

DESCRIPTION OF THE DRAWINGS

The foregoing, as well as other objects and benefits of the invention, will be more fully described below in connection with the best mode contemplated by the inventors of carrying out the invention, and in connection with which there is an illustration provided in the drawing, wherein.

DETAILED DESCRIPTION OF THE PREFERRED EMBODIMENT

As indicated above, the temperature inside vessels or conduits containing hot, solids laden gases and a layer of molten material on the walls can be measured using a pyrometer. In such a case, not only must the pyrometer be protected but the sight path into the vessel must be maintained straight, clear and free from all occlusions. Therefore, a system of elements like those illustrated in FIG. 1 is required.

Figure 1:
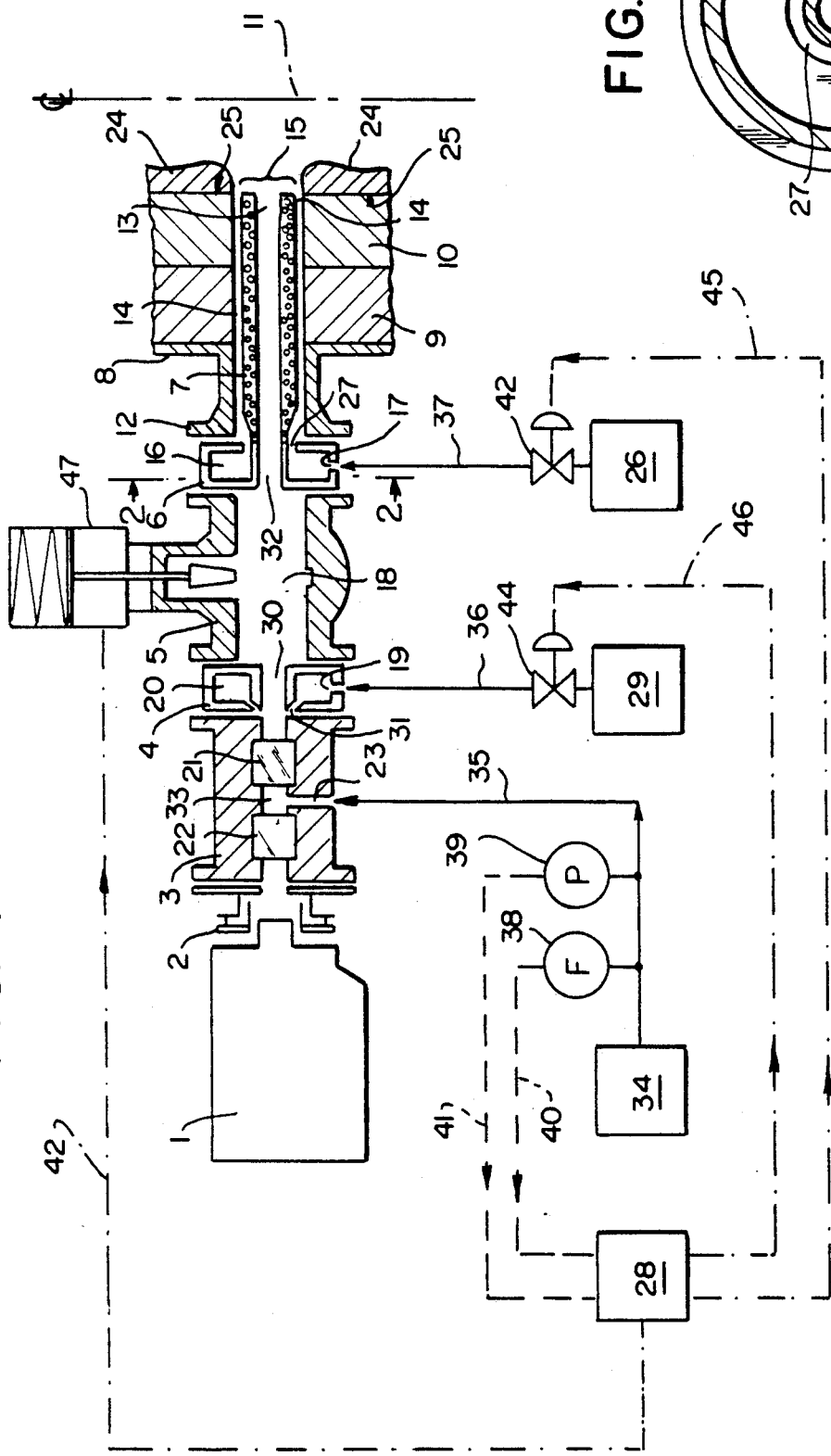
FIG. 1 is a schematic cross section illustrating a combination of the elements included in the invention.
Figure 2:
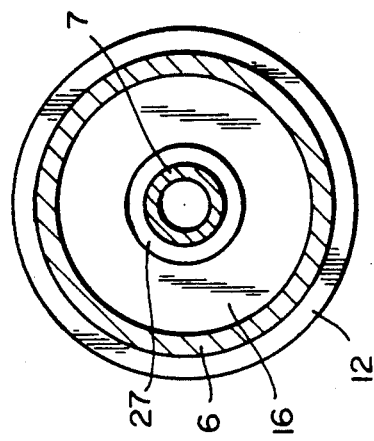

FIG. 1 shows a portion the vertical wall of a refractory lined vessel or conduit 8 in which a layer of molten material 24 develops on the innermost surface 25 of the lining. A pyrometer 1, attached to vessel 8 via flanged nozzle 12 and several of the other elements of the system, receives radiation from the interior 11 of vessel 8 through sight hole 15 formed by the interior of nozzle 12 and a coaxially aligned hole drilled through refractory layers 9 and 10. Inserted through the sight hole 15 and flush with the most interior surface 25 of the refractory layers is a sight tube 7 which is made from a refractory metal, such as an alloy of molybdenum having a high recrystallization temperature.

The sight tube 7 extends through all layers of the refractory lining of the vessel and connects to a sight tube centering ring 6 which is co-axially affixed to the flanged vessel nozzle 12. The sight tube centering ring 6 is constructed like a hollow doughnut, having a smaller, doughnut-shaped internal passage 16 which communicates with a side entry port 17 for connection to a supply of purge gas 26, such as nitrogen, via line 37. The internal passage 16 also communicates with the annular space 14 formed between the sight hole 15 and the sight tube 7 via several hole 27 which are equally spaced around the circumference of the centering ring. The space formed by the purge gas source 26, the side entry connecting port 17, the internal passage 16, the holes 27 and the annular space 14 provides a passage called the secondary purge stream, which provides a means for maintaining either a continuous or an intermittent flow of purge gas over the external surface of the sight tube 7. This secondary purge stream also doubles as an inert gas blanket which is used to protect the molybdenum alloy sight tube 7 in the case where it may be exposed to an oxidizing atmosphere. The supply of purge gas 26 is maintained at a pressure 10 to 1000 psi higher, but preferably 100 to 500 psi higher, than the pressure in the interior 11 of vessel 8; and the flow rate of purge gas is controlled by valve 43.

Connected to the sight tube centering ring 6 is a valve 5 which can close very rapidly in case of an emergency. It is understood that the valve 5 is constructed in such a way that, when the valve is in the open position, the interior space 18 provides no obstruction to the optical sight path between the interior of the vessel 11 and the pyrometer I. The actuator 47 of valve 5 is sized so that it can close the valve even if full differential pressure exists between the interior and the outside of the vessel. Closing of the valve 5 can be initiated either manually or by a control system 28 which supervises and controls the performance of the entire system.

The other side of the valve 5 is connected to a primary purge ring 4 which is in turn connected to a double sight glass spool piece 3. The double sight glass spool piece contains two high pressure sight glasses 21 and 22 which serve to pass thermal radiation from the vessel interior 11 to the pyrometer 1 while at the same time maintaining the pressure integrity of the vessel 8. The two sight glasses 21 and 22, the spool piece 3, the primary purge ring 4, the valve 5 and the sight tube centering ring 6 are all constructed, both separately and as a unit, to be able to withstand the high pressures which may be found inside vessel 8. The sight glasses 21 and 22 themselves may be constructed from any suitable material, such as quartz or sapphire, which has high transmissivity in the appropriate spectral region, as well as the necessary mechanical properties.

Similar to the sight tube centering ring 6, the primary purge ring 4 is constructed like a hollow doughnut, having a smaller, doughnut-shaped internal passage 20 which communicates with a side entry port 19 for connection to a supply of purge gas 29, such as nitrogen, via line 36. It should be noted that the source of gas 29 may be the same as the source of gas 26 for the sight tube centering ring 6; but it does not have to be. The supply of purge gas 29 is maintained at a pressure 10 to 1000 psi higher, but preferably 100 to 500 psi higher, than the pressure in the interior 11 of vessel 8; and the flow rate of purge gas is controlled by valve 44.

The internal passage 20 of the primary purge ring 4 also communicates with the cylindrical space 30 formed along the cylindrical axis of the doughnut-shaped purge ring 4 via several equally spaced holes 31. These holes are oriented circumferentially around the purge ring and at an angle with respect to the interior face of the primary sight glass 21.

The space formed by the purge gas source 29, the side entry connecting port 19, the doughnut-shaped internal passage 20, the circumferentially oriented holes 31, the cylindrical space 30 in the interior of the primary purge ring 4 and the interior spaces of the valve 5, the sight tube centering ring 6 and the sight tube 7, provides a purge gas flow passage, called the primary purge stream, which performs at least two functions. First, the interior face of the primary sight glass 21 is kept cool and optically clean by the sweeping action of the gas as it flows from the holes 31 over the face of the sight glass 21 and then into the space 30 in the interior of the primary purge ring 4. Second, the interior of the sight tube 7 and the sight tube opening 13 are purged and kept open and free of occlusions by the purging action of the gas flowing through the optical passage originating at the interior face of the primary sight glass 21 and continuing through the cylindrical space 30, the interior space 18 of ValVe 5, the interior space 32 of the sight tube centering ring 6, the interior of the sight tube 7 and the sight tube opening 13. The flow of purge gas in these spaces can be either continuous or intermittent as will be explained later.

Purge gas exiting both openings 13 and 14 enters vessel interior 11 and mixes with the reaction gases.

The double sight glass spool piece 3, the primary purge ring 4, the valve 5 and the sight tube centering ring 6 are all fitted on each end with ring joint type flanged fittings which tend to automatically align all these elements coaxially with each other. The sight tube 7 is constructed so that it is also coaxially aligned with the above mentioned elements. The pyrometer 1 is attached to and held in precise optical alignment with the rest of the elements in the system by an optical alignment ring 2 which is also fitted with a ring joint type flanged fitting for connection to the exterior end of the double sight glass spool piece 6. Optical alignment of the pyrometer 1 is accomplished by turning adjustment screws on the optical alignment ring 2.

Thus, the optical sight path from the pyrometer 1 to the interior 11 of vessel 8 originates at the objective lens of the pyrometer and passes through the optical alignment ring 2, the two coaxially aligned high pressure sight glasses 21 and 22 of the double sight glass spool piece 3, the cylindrical space 30 of the interior of the primary purge ring 4, the interior space 18 of the valve 5, the cylindrical space 32 of the interior of the sight tube centering ring 6, the cylindrical interior of the sight tube 7, and the sight tube opening 13.

In addition to the combination of elements described above, and the means provided for purging both the optical sight path and the exterior cylindrical surface of the sight tube 7, the system claimed herein provides means to safely isolate the pyrometer 1 and sight glasses 21 and 22 from the vessel 8 in case of an emergency.

In brief, the safety system consists of a means to monitor the condition of both sight glasses as well as a means to take remedial action in the unlikely event that one or both of the sight glasses fails.

The primary element of the safety system is the double sight glass spool piece 3. Referring to FIG. 1, it can be seen that the primary sight glass 21 and the secondary sight glass 22 are separated by a small, sealed, gas-tight space 33 which communicates with a side entry port 23 for connection to a high pressure source of gas 34 via line 35. The source of gas 34 may be the same as the gas sources 29 and/or 26, but need not be. In general, however, the gas from source 34 will be an inert gas. The pressure of gas source 34 is controlled in such a way that it is always at a pressure 10 to 500 psi higher, and preferably 100 to 200 psi higher, than the pressure in the interior 11 of vessel 8. Normally, there is no flow of gas in line 35 because that line terminates in the sealed, gas-tight space 33 between sight glasses 21 and 22. However, if one or both of the sight glasses and were to fail and begin to leak gas, flow sensor 38 would detect a flow greater than zero in line 35, and pressure sensor 39 would detect a pressure decrease from the set pressure. In such an instance, sensors 38 and 39 would send signals via signal lines 40 and 41 respectively to control system 28. Upon receiving a signal from either line 40 or line 41, or from both, control system 28 causes valve 5 to close via line 42.

If a sight glass were to fail, the safety system also provides a means to determine which one has failed. If the primary sight glass 21 has failed, the pressure in line 35, as detected by pressure sensor 39, will decrease by no more than the difference between the pressure of source 34 and the pressure in vessel interior However, if the secondary sight glass 22 fails, the pressure in line 35 will decrease to a level below the pressure in vessel interior 11.

It should be noted that even if one or both of the sight glasses fail, none of the contents of vessel 8 will be lost from the vessel, a condition which, if allowed to persist for several seconds, could result in catastrophic damage to the nozzle 12 and vessel 8. If the primary sight glass 21 fails, gas from source 34, which is at a pressure higher than that inside the vessel 8, will begin to flow through line 35, through the failed primary sight glass 21 into the purged optical sight path and into the vessel interior 11. This flow condition lasts only for the short period of time, on the order of a fraction of a second, that it takes for sensors 38 and 39 to detect the fault and signal control system 28 to close valve 5.

Alternately, if the secondary sight glass 22 fails, gas from source 34, will begin to flow through line 35, through the failed secondary sight glass 22, into the optical alignment ring 2 and out into the ambient environment. Again, valve 5 closes quickly when the sensors 38 and 39 detect the change in line 35 and activate control system 28.

Operation

A most important aspect of this invention, however, is the means whereby the various purge gas streams are controlled in order to maintain a clear optical sight path into a vessel containing hot, particle laden gases and having a layer of molten material which tends to run down the vertical wall of the vessel into the opening of the sight tube.

Referring again to FIG. 1, in a vessel having molten material 24 on its walls 25 and containing molten and solid particles in the gas, both solid particles and molten material will tend to enter the sight tube opening 13 causing it to become obstructed and causing the optical sight path to the pyrometer 1 to become occluded. The group of elements comprised of the purge gas supply 29, the control valve 44, the supply line 36, the primary purge ring 4 and the open spaces 20, 31, 30, 18, 32, and 13 is called the primary purge stream. By maintaining a constant stream of gas from source 29 within the primary purge stream, the optical sight path from the interior face of the primary sight glass 21 to the sight tube opening 13 may be kept clean and free of solid and molten particles.

In the case where vessel 8 contains hot gases with few molten particles, a constant primary purge stream is all that is needed to keep the sight tube opening 13 clear and free of occlusions. However, in the case where there are high concentrations of molten particles, and where there is a significant layer of molten material 24 on the inner wall 25 of the vessel 8, a large deposit of material tends to accumulate over the top of sight tube opening 13 because the cool purge gas creates a cold spot in the wall 25 which lowers the temperature in that area below the melting point of the molten material. Initially this growing accumulation does not significantly occlude the sight tube opening 13 and therefore does not noticeably affect the temperature reading obtained with the pyrometer 1. Eventually, however, the accumulation grows to the point where it begins to sag under its own weight and begins to droop down over the sight hole creating a significant occlusion and dramatically affecting the temperature reading.

The means provided by this system of elements to remedy the problem just described consists of two steps: first, the accumulated material is allowed to reheat so that it begins to become molten again; and second, the accumulation is forced, or blown, out of the way and into the vessel interior 11 by a high volume impulse of high pressure purge gas directed at the accumulation along the optical sight path as well as through the annular space 14.

The detailed process of clearing an occlusion is as follows: When an occlusion occurs as a result of a growing accumulation of material, the occlusion can be detected by a steady decrease in the pyrometer temperature reading. When this happens, control system 28 closes valves 5 and 43 via lines 42 and 45 respectively. This action stops the flow of purge gas in both the primary purge stream, i.e. the optical sight path, as well as in the secondary purge stream, i.e. the annular space 14. It also momentarily interrupts the temperature reading; however, if two identical systems are used on the same vessel, one system can always be measuring temperature while the other one is executing this impulse procedure. Note also that valve 5 is closed, rather than valve 44, in order to protect the primary sight glass 21 while the primary purge stream is stopped.

With both valves 5 and 43 closed and both purge streams stopped, the cold spot in the wall 25 disappears and the accumulation of material begins to become molten again. At the same time, the pressures of purge gas sources 26 and 29 are increased in order to fill supply lines 36 and 37 with large volumes of purge gas for the next step.

After an appropriate amount of time has elapsed, normally between 1 and 60 minutes, but preferably 1 to 15 minutes, control system 28 quickly opens valves 5, 43 and 44 wide open via lines 42, 45 and 46 respectively. This high volume flow of gas is maintained for a period of time normally lasting from 1 to 60 seconds, but preferably from 5 to 15 seconds. The pyrometer reading returns to its previous value during this period as the occlusion is blown away. Following this period, control system 28 readjusts the valve positions of valves 43 and 44 to their previous operating positions, and lowers the pressures of gas sources 26 and 29 to their normal levels.

It is understood that although modifications and variations of the invention can be made without departing from the spirit and scope thereof, only such limitations should be imposed as are indicated in the appended claims.

We claim:

1. The combination with a reactor for reacting a hydrocarbonaceous mixture in the reactor's reaction chamber to produce a synthetic gas and particulate matter, said reactor being characterized by an internal wall, a refractory lining about the reaction chamber and a borehole traversing said liner from a port in the reactor wall and opening into the reaction chamber, a removable sight tube assembly positioned in said borehole to afford visual access to the reaction chamber to conduct radiation therefrom and comprising an elongated tubular element defining an internal cylindrical sighting passage having a face and an inner open end, and an outer open end, and being positioned in said borehole to define a second, annular purge gas passage between said tubular element and said borehole, said elongated tubular element longitudinally registered in said borehole whereby the face at the inner open end thereof lies in a plane common with the reaction chamber wall, a toroidal, manifold attached to said outer open end of said elongated tubular element and having an inlet communicating with a pressurized source of a purge gas, and at least one discharge port communicating with said annular purge gas passage, a shut-off valve having an inlet attached to said manifold, which, when open, affords straight line-of-sight visual access through the valve and the elongated tubular element, and having an outer end, a second toroidal, manifold attached to said outer end of said valve and having an inlet communicable with a pressurized source of purge gas, and at least one discharge port communicated with an axial space enclosed by the second toroidal manifold, said axially enclosed space being immediately contiguous with the interior space of the shutoff valve which, in turn, is in connection with a cylindrical gas passage defined by the tubular element, a spool piece containing two coaxially aligned sight glasses attached to the second toroidal manifold and, in cooperation with the second toroidal manifold, the shut-off valve, the first toroidal manifold, the tubular element, the various gas sources and supply lines and the reactor, forming a gas tight enclosure, said spool piece including a small, sealed, gas-tight enclosure between said two coaxially aligned sight glasses, where said enclosure has an inlet communicable with a pressurized source of a gas, and a optical alignment element connected to the remote end of said spool piece providing a means for attaching and optically aligning a pyrometer or any other such radiation receiving device for the purpose of measuring the radiation emitted by the gaseous and particulate material contained within the reactor.

2. The combination as defined in claim 1, wherein said elongated tubular element inner, open end face terminates substantially in the same plane as the reaction chamber wall, and wherein said tubular element, said internal cylindrical purge gas passage and said annular purge gas passage are substantially uniform in cross-sectional area in a plane normal to the longitudinal axis of said tubular element.

3. The tubular element as defined in claim 1 wherein said tubular element is fabricated from a material charterized by high temperature strength and high recrystallization temperature, and wherein said tubular element with high temperature strength is able to withstand, without distortion, shear forces which may be placed upon it by shifting layers of the refractory lining inside the vessel, and wherein said tubular element is resistant to thermal stresses resulting in spilling and deterioration.

4. The apparatus as defined in claim 1, wherein the combination of elements are connected in such a way as to provide a removable, straight, unobstructed optical sight path extending from the interior surface of said reaction chamber to the attached radiation receiving device, when said shutoff valve is in its normal open position.

5. The apparatus as defined in claim 1, wherein the first toroidal manifold, the second toroidal manifold and the double sight glass spool piece are all connected to sources of gas at pressures higher than the pressure 6. The apparatus as defined in claim 5, wherein means are provided for independently controlling the respective pressure and flow rates of purge gas entering the internal passages of the first and second toroidal manifolds.

7. The apparatus as defined in claim 6, wherein the purge gas is an inert gas such as nitrogen.

8. The apparatus as defined in claim 6, wherein the purge gas is a process gas such as a recycled gas from the reactor or conduit.

9. The apparatus as defined in claim 5, wherein sensors are provided to detect an increase in pressure and/or the presence of gas flow in the small, sealed, gas-tight enclosure between the two sight glasses in the spool piece and to automatically activate the shut off valve to close.

10. A system for maintaining a clear, unobstructed sight path for a pyrometer sighted into a vessel containing hot solids and laden gases by using the apparatus defined in claim 1, wherein both the cylindrical sighting passage in said tubular element and the annular space exterior to the tubular element are purged simultaneously and continuously in order to prevent particles from entering into the tubular element and occluding the sight path.

* * * * *